J. Ridge.

Lamp Burner.

No. 2,855. Reissued Feb. 4, 1868.

Witnesses.

A. N. Norton

John Finley.

Inventor.

Joseph Ridge

N. PETERS, PHOTO-LITHOGRAPHER, WASHINGTON, D. C.

United States Patent Office.

JOSEPH RIDGE, OF RICHMOND, INDIANA.

*Letters Patent No.* 34,984, *dated April* 15, 1862; *reissue No.* 2,855, *dated February* 4, 1868.

COAL-OIL LAMP.

The Schedule referred to in these Letters Patent and making part of the same.

TO ALL WHOM IT MAY CONCERN:

Be it known that I, JOSEPH RIDGE, of the city of Richmond, county of Wayne, and State of Indiana, have invented a new and useful Improvement in Kerosene or Coal-Oil Burners; and I do hereby declare that the following is a full and exact description of the same, reference being had to the accompanying drawings making a part of this specification, in which—

The same letters in the different figures refer to corresponding parts of the invention.

Figure 1:
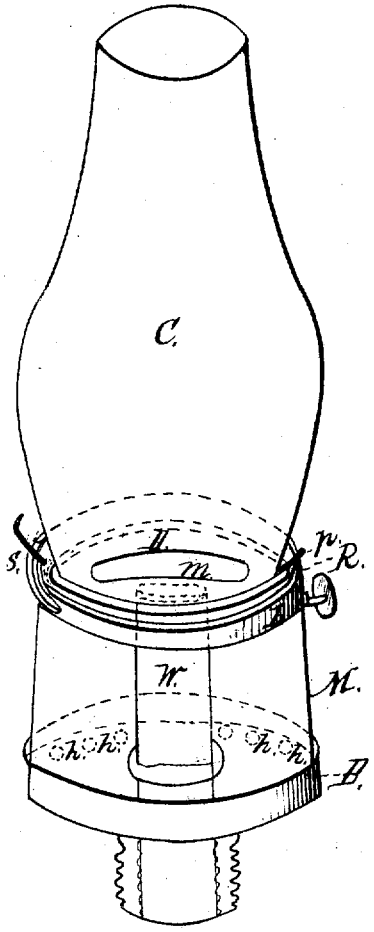
Figure 1 is a perspective view.
Figure 2:
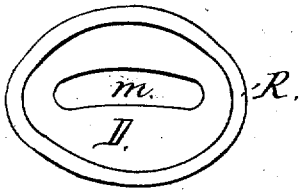
Figure 2 is a view of a transverse section.

The nature of this invention consists in the use of mica, glass, or other transparent material beneath the base of the deflector, or between the latter and the base of the burner in kerosene or coal-oil burners.

The manner, heretofore, of constructing burners having deflectors, has been to rest the base of said deflector within the base of the burner, by which arrangement, even with the aid of a transparent deflector, only the rays of light above the base of the deflector were serviceable, the more downwardly-directed rays being obstructed by the base of the burner. The manner of constructing said burner also permitted a direct communication of heat from the flame to the base of the burner, and thus to the lamp, through the instrumentality of a conical deflector, with its base resting on the base of the burner, as aforesaid. By using transparent material, as in my invention, between the base of the deflector and base of the burner, a greater amount of light is obtained from the flame, and the lamp is rendered less liable to heat.

To enable others skilled in the art to make and use my invention, I will proceed to describe it with reference to the drawings.

B represents the base of the burner, made of metal, and perforated for the admission of air. A metal ring, *b*, is supported by vertical studs or posts, rigidly attached to the base of the burner, and the space between the ring *b* and base, B, of the burner is enclosed with mica, M, thus forming a cylindrical enclosure below the deflector. The ring *b* is shouldered on the inside, for supporting the said deflector D, the object of ring *b* and the aforesaid studs or posts being to properly secure the essential devices of the burner. The aforesaid deflector is constructed of the ring D, which forms its flanch or base, which is composed of two layers, separated around their inner edge, forming a groove, into which segmental pieces of mica, *m m*, are inserted, being first formed of proper length and size to give the proper-sized slot; and also, to give that part of the deflector a convexity, the deflector may be composed entirely of metal or of any suitable material. W represents the wick-tube, with a convenient arrangement for adjusting the wick. The base of chimney C rests on the base of deflector D, where it may be secured in any convenient form. The burner is connected with the lamp in the usual manner.

Having thus fully set forth and described my said invention, I will proceed to specify what I claim, and desire to secure by Letters Patent.

I do not claim a transparent reflector, nor do I claim a deflector of any particular kind of material; but What I do claim, is—

1. The use of transparent material between the base of the deflector and base of the burner, substantially as described, and for the purposes specified.

2. The combination and arrangement of the base, B, of the burner, the transparent enclosure M, the deflector D, and chimney C, substantially as set forth, and for the purposes described.

3. The base of the chimney, located at a point above the base of the burner, and having interposed between said bases a transparent enclosure, for the purpose of utilizing the light emitted by the flame beneath the base of the chimney, substantially as described.

JOSEPH RIDGE.

Witnesses:

H. L. JONES,

JNO. L. SHAW.